United States Patent [19]

Scanlon

[11] Patent Number: 4,573,909
[45] Date of Patent: Mar. 4, 1986

[54] BILLET HEATING FURNACE WITH ADJUSTABLE PRESSURIZED ENTRANCE SEAL

[75] Inventor: Robert M. Scanlon, Rockford, Mich.

[73] Assignee: Granco-Clark, Inc., Belding, Mich.

[21] Appl. No.: 637,436

[22] Filed: Aug. 3, 1984

[51] Int. Cl.[4] ............................................. F27B 3/04
[52] U.S. Cl. ..................................... 432/133; 432/152; 432/176
[58] Field of Search ................... 432/78, 80, 163, 164, 432/176, 179, 194, 242, 133, 128, 143, 144, 146, 153, 2, 21, 152

[56] References Cited

U.S. PATENT DOCUMENTS

| 2,029,580 | 2/1936 | Merkt | 432/176 |
| 2,081,954 | 1/1982 | Phillips | 432/163 |
| 2,088,554 | 7/1937 | Robson et al. | 432/176 |
| 3,841,614 | 10/1974 | Okuno | 432/164 |
| 4,022,571 | 5/1977 | Gentry et al. | 432/180 |
| 4,309,171 | 1/1982 | Gentry | 432/163 |

Primary Examiner—Henry C. Yuen
Attorney, Agent, or Firm—Varnum, Riddering, Schmidt & Howlett

[57] ABSTRACT

A furnace (10) has a preheater zone (12) into which exhaust gases from a combustion chamber (14) are recycled for preheating of articles passing through the furnace. The exhaust gases are supplied to the preheater zone (12) through jet pipes (18) which create a turbulent flow about the articles in the furnace (10). The exhaust gases are withdrawn by a fan (30) which is disposed in a duct (34) adjacent to the furnace entrance (13). To prevent the introduction of ambient air into the furnace (10), a pressure chamber (56), which is maintained at about atmospheric pressure, is provided within the preheater zone (12), with the chamber (56) pressurized by gases supplied by exhaust gases passing through a separate pipe (70) which has an adjustable valve (72) to adjust the pressure in the chamber (50). A sealing arrangement defined by the pressure chamber (56) and the articles passing through the furnace prevents the introduction of cool air through the preheater zone (12). In this way, the thermal efficiency of the fuel burned within the combustion chamber (14) is maximized while a pressure balance is maintained in the furnace.

4 Claims, 2 Drawing Figures

BILLET HEATING FURNACE WITH ADJUSTABLE PRESSURIZED ENTRANCE SEAL

BACKGROUND OF THE INVENTION

1. Field of the Invention

The invention relates to a furnace for heating articles in which exhaust gases of the combustion chamber are recirculated for preheating of the articles, the furnace having a partially sealed pressure chamber disposed at the front end of the preheating section to prevent the introduction of ambient air into the furnace.

2. State of the Prior Art

It is common to use furnaces having an elongated heating chamber for heating billets for logs used in extrusion or similar metal working operations. A typical furnace has an elongated heating chamber in which burners are disposed along the length of the furnace to direct burning gases against the billets as they move through the heating chamber. Such furnaces are often of the flame impingement type in which the burner flames envelope the billets within the furnace.

It is known to use the exhaust gases of the combustion chamber to preheat the billets within the furnace. In U.S. Pat. No. 3,837,794, issued Sept. 24, 1974, a billet heating furnace similar to that described above is disclosed in which hot combustion gases are drawn through a preheating zone for heat exchange with the articles passing therethrough. It is also known to exchange the heat of the combustion gases with combustion air and supply this air to a preheating zone as well as to burners in a heating chamber. Such a furnace is disclosed in U.S. Pat. No. 4,022,571, issued May 10, 1977. Additionally, U.S. Pat. No. 3,841,614, issued Oct. 15, 1974, discloses an apparatus for preheating articles in which the hot exhaust gases are supplied through jet nozzles in a preheater zone in order to provide a turbulent flow about the articles being preheated.

In U.S. Pat. No. 4,309,171 (issued Jan. 5, 1985) there is disclosed and claimed a furnace of the above-described type wherein a pressure balance is maintained throughout the length of the furnace and a special pressure chamber is provided near the entrance end of the furnace with a pressure sealing arrangement to maintain the chamber at or slightly above atmospheric pressure, while the remainder of the preheater section is below the pressure in the pressure chamber. In this manner, the proper flow of gases through the furnace is maintained, while at the same time, the pressure at the entrance and exit ends of the furnace is maintained at or slightly above atmospheric pressure so as to minimize the introduction of ambient air into the furnace. The pressure chamber is maintained at an elevated pressure through special jet pipes which extend through the preheater section and into the special pressure chamber. It has been found that it is difficult to adjust the pressure in the pressure chamber with the jet pipes. It is desirable that the pressure in the pressure chamber be easily adjustable by external means so as to maintain the appropriate pressure in the pressure chamber.

SUMMARY OF THE INVENTION

In accordance with the invention, there is provided a furnace for heating articles to an elevated temperature wherein the articles are moved serially from an entrance end of the furnace to an exit end and the furnace has a preheater section at an entrance end of the furnace and a heating chamber at the exit end thereof. Means are provided in the heating chamber for directing combustible gases against the articles therein and means provide a turbulent gas flow along the length of the preheater section against the articles passing therethrough. Exhaust means are provided for drawing the exhaust gases from the preheater section of the furnace and for pressurizing the exhaust gases. Means communicate with the pressurized exhaust gases and with the means providing turbulent flow of the gases. The preheater section is divided into first and second chambers with the first chamber extending from the entrance end of the furnace along a portion of the length of the preheater section and the second chamber extending from the first chamber from the heating chamber. The first chamber is maintained at about atmospheric pressure and above the pressure in the second chamber with the pressurized gases. According to the invention, means are provided for selectively adjusting the pressure in the first pressure chamber independent of the pressure in the second chamber.

Preferably, the exhaust gas communicates with the first chamber through a fan which draws the exhaust gases from the furnace. The means for maintaining the first chamber at a first pressure comprise a conduit external to the second chamber between the fan outlet and the first chamber. The means for adjusting the pressure in the first chamber preferably includes an adjustable valve in the conduit.

BRIEF DESCRIPTION OF THE DRAWINGS

The invention will be described with reference to the accompanying drawings wherein like members bear like reference numerals, in which.

DETAILED DESCRIPTION OF THE PREFERRED EMBODIMENT

Figure 1:
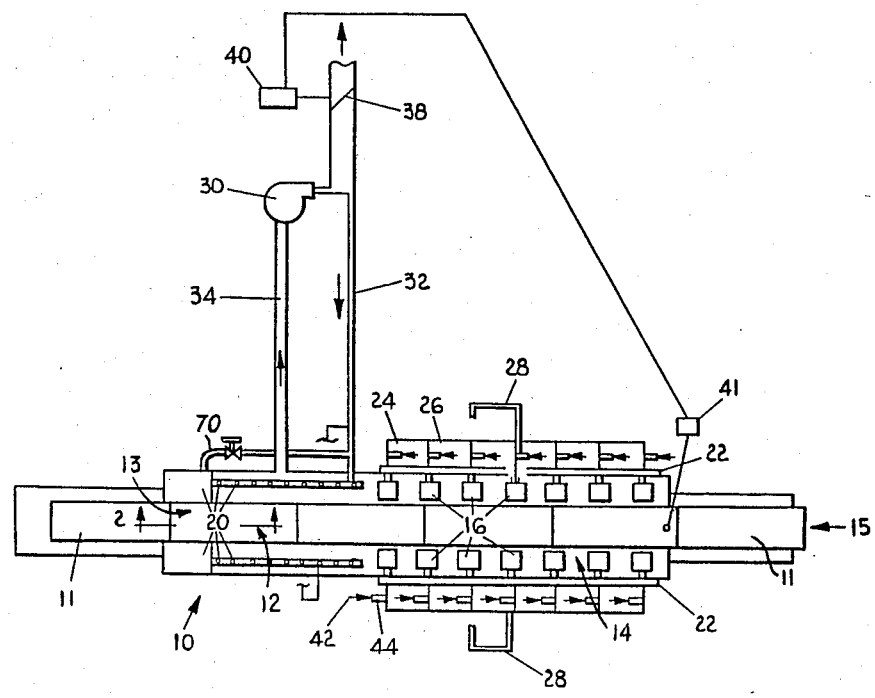
FIG. 1 is a schematic representation of a furnace according to the invention showing an air flow system including direct recirculation of exhaust gases into the furnace.

With reference to FIG. 1, a heating furnace 10 is shown having a fired heating chamber 14 and an unfired preheater zone 12. The preheater zone 12 includes an entrance opening 13 through which billets or logs 11 enter the furnace 10. The billets or logs are pushed through the furnace in a conventional manner such as that disclosed in U.S. Pat. No. 3,837,794 (issued Sept. 24, 1974).

A plurality of gas burners 16 are disposed along the length of the heating chamber 14. A gas manifold 22 supplies fuel to the burners 16 while combustible air is provided through air pipes 24 and manifold 26. Within the preheater section 12 are jet pipes 18 which extend longitudinally along the preheater zone 12. The jet pipes 18 preferably do not extend into the heating chamber 14 of the furnace. In order to provide turbulent gas fluid in the preheater zone 12, the jet pipes 18 are provided with nozzles 20 which are formed by small openings in the pipes 18.

Although the furnace uses natural gas to supply the gas burners 16 with fuel, a liquid fuel, such as fuel oil, may be supplied through a conduit 42 and atomized by injectors 44 into the heated combustion air. Such an embodiment of the invention including the fuel conversion means is disclosed in U.S. Pat. No. 4,022,571 and does not form a part of the present invention.

A duct 34 which communicates with a fan 30 withdraws exhaust gases generated within the furnace. The exhaust duct 34 is disposed adjacent to the entrance end of the furnace to provide for maximum heat recovery from the exhaust gases. In placing the exhaust duct near the entrance to the furnace, the exhaust gases are drawn over the articles passing through the furnace so as to preheat them prior to entering the heating chamber. The exhaust fan 30 creates a positive draft within the furnace to aid the removal of the exhaust gases. The countercurrent flow of gases within the furnace creates a pressure differential, with the exit end typically at a slightly positive pressure or near zero, and the entrance end at a negative pressure, for example 5-6 in water column.

In order to provide maximum heat transfer of the combustion gases, it is desirable to recirculate the gases into the preheater zone 12 of the furnace. Accordingly, a supply conduit 32 communicates the exhaust of the fan 30 with the jet pipes 18 disposed in the preheater zone. The fan 30 pressurizes the hot exhaust gases before passing them to the jet pipes 18 in order to increase the turbulent flow into the preheater zone. The pressure within the furnace is regulated by means of a damper valve 38 disposed within a stack 36 provided on the exhaust fan. The damper valve 30 is regulated by valve actuator 40 which responds to the pressure at the exit end of the furnace to maintain the pressure therein at a predetermined value at or about atmospheric pressure. To this end, a pressure sensor 41 is provided at the discharge end of the heating chamber 14 of the furnace with a conventional probe to detect the pressure at such location.

Figure 2:
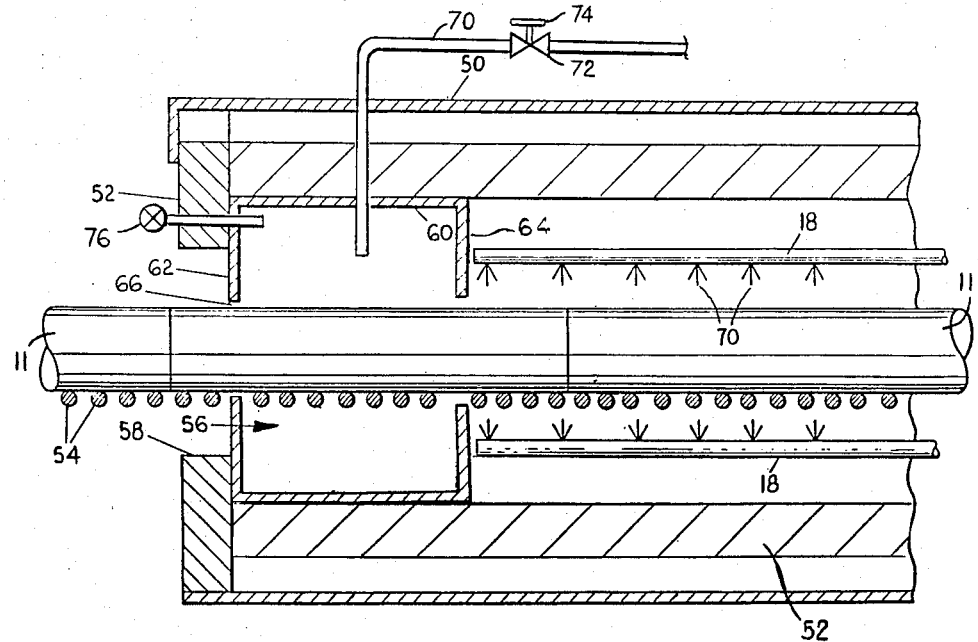
FIG. 2 is a sectional view taken along line 2—2 of FIG. 1.

With reference to FIG. 2, the pressure seal arrangement of the invention is shown. A furnace housing 50 is lined with a suitable refractory material 52 in a conventional manner. The jet pipes 18 extend along the length of the preheater zone 12 as described above. The pattern of the gases as they emanate from the pipes is illustrated by lines indicated by the number 70. The entrance opening 13 comprises a billet entrance port 58 in the wall of the furnace housing 50 to allow introduction of the billets or logs into the furnace. The billet entrance port 58 places a relatively large opening at the entrance opening 13 of the furnace through which ambient air may be drawn, thereby reducing the heat transfer capability of the gases within the furnace. A pressure chamber 56 is disposed within the entrance section of the preheater zone 12 to seal the preheater zone from the ambient air.

The pressure chamber 56 typically includes a longitudinally extending housing 60 disposed adjacent to the walls of the furnace lining 52. The pressure chamber 56 extends over only the entrance portion of the length of the preheater section 12 to define a first pressure section and a second section of relatively lower pressure within the preheater section 12. A pair of end plates 62, 64 are provided at the ends of the cylinder 60 to enclose the pressure chamber. In order to allow the introduction of billets into the furnace, it is necessary to provide openings 66, 68 in the end plates 62, 64 of the pressure chamber. The openings generally conform to the size of the billets or logs passing through the furnace. Accordingly, when articles are introduced into the entrance end of the preheater zone, a sealing relationship is formed by the openings in the end plates 66, 68 and the articles passing through the preheater. In this way, a partially sealed chamber is created in which pressurized gases may be introduced in order to prevent the introduction of ambient air.

According to the invention, a branch line 70 is connected at one end to the supply conduit 32 and at the other end to the pressure chamber 56 to supply pressurized gases thereto. A butterfly valve 72 having an adjustment handle 74 is provided in the branch line 70 to control the volume of gases passing through the branch line 70 and to thereby control the pressure within the pressure chamber 56. A pressure gauge 76 is provided at the front face of the furnace and has a tap which extends into the pressure chamber 56 so that the pressure in the pressure chamber 56 can be read from outside of the furnace.

In operation, billets or logs are fed through the entrance 13 of the furnace so they pass through the preheater section 12 and the heating chamber 14. After the billets are heated to the desired temperature they are withdrawn through the exit end 15 of the furnace. The gas burners 16 disposed within the heating chamber 14 heat the billets or logs by direct flame impingement from the burners. Due to the forced draft within the furnace created by the fan 30, the gases of combustion within the heating chamber are drawn into the preheater section and exhausted through conduit 34. The exhaust gases are pressurized in fan 30 and a portion of the gases are then reintroduced into the preheater zone 12 through conduit 32 which is connected with the outlet of the fan 30. The hot exhaust gases are thereby recirculated to the preheater zone by means of jet pipes 18, which create a turbulent flow about the articles passing through the preheater zone. Such a turbulent flow increases the heat transfer capabilities of the exhaust gases.

Since the branch line 70 is connected to the pressure chamber 56 which is closed by the seal defined by the articles and the plates 66, 68, the chamber 56 is maintained at an elevated pressure relative to the preheater section 12. Preferably, the pressure in the pressure chamber 56 is at or slightly above atmospheric pressure. The adjustment handle 74 on valve 72 provides the mechanism to make precise adjustments to the pressure within the pressure chamber 56. The pressure gauge 76 can be observed while the adjustments are made to the handle 74. In this way, the introduction of ambient air into the entrance end of the furnace is minimized. By eliminating the introduction of ambient air into the furnace, the exhaust gases are maintained at a relatively high temperature which increases the preheating of the articles passing through the furnace.

The invention increases fuel efficiency by recirculating exhaust gases which are maintained at a maximum temperature. The pressure chamber disposed at the entrance end of the preheater zone provides a means for minimizing the induction of ambient air into the furnace. In this way, the thermal efficiency of the gases burned within the heating chamber is maximized. A turbulent gas flow within the preheater zone also serves to increase the heat transfer from the gases to the articles passing through the furnace. The sealing arrangement provided at the front end of the furnace allows the use of a forced draft exhaust system which is disposed at the front end of the furnace while maintaining a desirable pressure balance within the furnace. In this way, the counter current flow of the exhaust gases over the articles passing through the furnace aids the preheating of the articles and provides the desired pressure gradient in the furnace.

Accordingly, the invention improves over the prior known furnaces by providing a means to maintain the pressure balance at the entrance end of the furnace by easy external adjustment while directly observing the pressure at a critical spot in the furnace. The pressure chamber arranged within the preheater zone permits the use of a forced air exhaust system without reducing the temperature of the exhaust gases due to the introduction of ambient air.

The foregoing specifications and drawings are merely illustrative of the invention and are not intended to limit the invention to the disclosed embodiment. Reasonable variation and modification which are obvious to one skilled in the art are intended to be within the scope and nature of the invention which is defined by the appended claims.

The embodiments of the invention in which an exclusive property or privilege is claimed are defined as follows:

1. In a furnace for heating articles to an elevated temperature wherein the articles are moved serially from an entrance end of the furnace to an exit end thereof comprising:

a preheater section at an entrance end of the furnace and a heating chamber at an exit end thereof;

means in said heating chamber for directing combustible gases against the articles therein;

means for providing turbulent gas flow along the length of said preheater section;

exhaust means including a fan communicating with said preheater section for drawing the exhaust gases of said combustible gases from the furnace;

said exhaust means drawing said exhaust gases from said heating chamber to said preheater section;

means for pressurizing said exhaust gases;

means for communicating said pressurized exhaust gases with said means providing turbulent gas flow;

means in said preheater section defining first and second chambers therein, said first chamber extending from the entrance end of the furnace along a portion of the length of said preheater section and said second chamber extending from said first chamber to said heating chamber; and means for maintaining said first chamber at a first pressure at about atmospheric pressure and above the pressure of said second chamber with said pressurized exhaust gases, the improvement which comprises:

means external to said preheater section for adjusting said pressure in said first chamber independent of the pressure in said second chamber;

said means for maintaining the pressure in said first chamber at a first pressure comprises a conduit between said fan outlet and said first chamber, and said means for adjusting said pressure in said first chamber includes an adjustable valve in said conduit;

said means defining said first and second chambers includes a first baffle adjacent the entrance end of said furnace and a second baffle spaced inwardly from said first baffle; and said first and second baffles include openings which closely conform to the configuration of articles which are heated in said furnace whereby said openings and said articles define a gap sealing arrangement.

2. The furnace of claim 1 wherein said means for directing combustible gases includes burner means for burning combustible fluids.

3. The furnace of claim 2 wherein said burners are of the flame-impingement type.

4. The furnace of claim 1 and further comprising means for maintaining the pressure in said heating chamber exit end at a predetermined value near atmospheric pressure.

* * * * *